US005468325A

United States Patent [19]
Eckelt et al.

[11] Patent Number: 5,468,325
[45] Date of Patent: Nov. 21, 1995

[54] PROCESS FOR APPLYING AN ADHESIVE BAND HAVING ONE ADHESIVE SIDE

[75] Inventors: Ulrich Eckelt, TE-Leeden; Karl-Ernst Timmerbeil, Ennepetal, both of Germany

[73] Assignee: Windmöller & Hölscher, Lengerich, Germany

[21] Appl. No.: 140,823

[22] Filed: Oct. 25, 1993

[30] Foreign Application Priority Data

Oct. 26, 1992 [DE] Germany ............... 42 36 100.1
Feb. 5, 1993 [DE] Germany ............... 43 03 410.1

[51] Int. Cl.⁶ ............... B32B 31/10; B32B 31/18
[52] U.S. Cl. ............... 156/259; 156/212; 156/227; 156/250; 156/256; 156/267; 156/475; 156/522; 156/539; 156/567
[58] Field of Search ............... 156/212, 216, 156/227, 250, 476, 475, 510, 511, 522, 539, 566, 567, 573, 256, 259, 264, 271, 267

[56] References Cited

U.S. PATENT DOCUMENTS

| | | | |
|---|---|---|---|
| 2,776,068 | 1/1951 | Johnson | 156/522 X |
| 2,834,500 | 5/1958 | Jackson | 156/567 |
| 3,649,419 | 3/1972 | Anderegg et al. | 156/567 |
| 3,679,522 | 7/1972 | Anderegg et al. | 156/567 X |
| 3,762,283 | 10/1973 | Renner | 156/522 X |
| 4,685,993 | 8/1987 | Flaherty et al. | 156/475 |

Primary Examiner—David A. Simmons
Assistant Examiner—M. Curtis Mayes
Attorney, Agent, or Firm—Keck, Mahin & Cate

[57] ABSTRACT

A process for applying an adhesive band with one adhesive side to the narrow rim of an elongated workpiece, particularly a coathanger of corrugated paper, includes the following steps: removing a workpiece from a magazine; sorting the workpieces into corresponding compartments of a compartmented disk carousel that rotates on an axis; forward cyclical rotation of the filled compartmented disk carousel, such that the workpieces placed in the compartments, which are positioned one on top of the other, are transported to other processing stations; at the next processing station, pressing the adhesive band, which has one adhesive side, onto the narrow rims of the flattened workpieces, which project from the compartments of the carousel; at another processing station, cutting the adhesive band and pressing it to the lateral profile of the narrow rim; at another processing station, folding and pressing the projecting edges of the adhesive band against the workpiece, and ejecting the fully processed workpiece. A device for implementing the process is described.

1 Claim, 7 Drawing Sheets

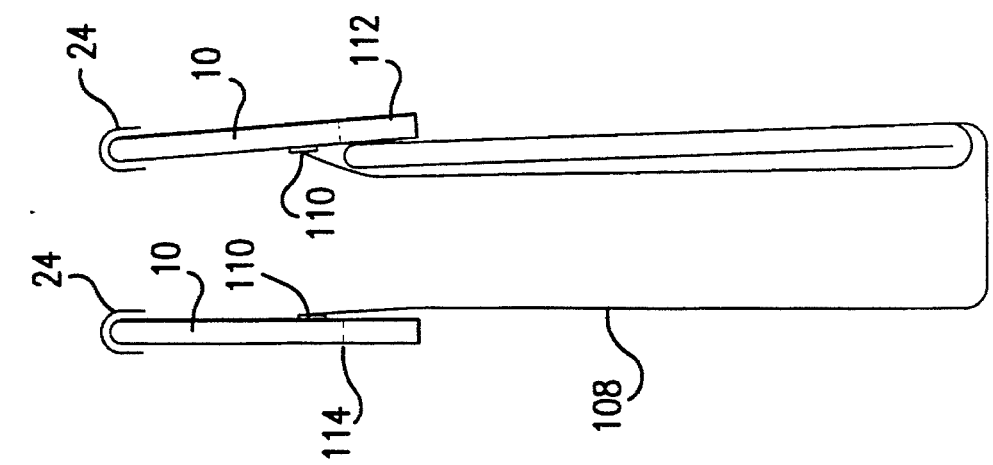
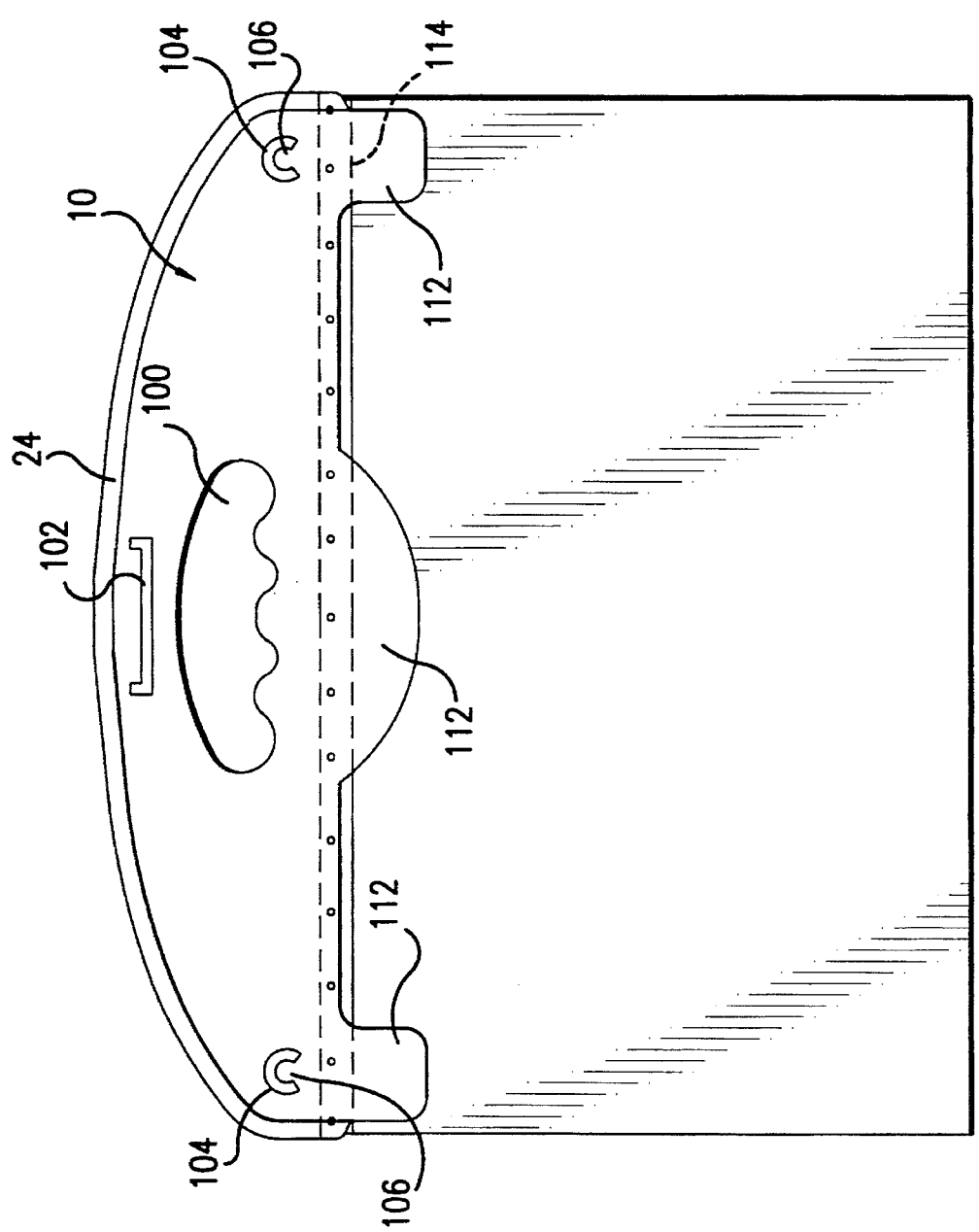

PROCESS FOR APPLYING AN ADHESIVE BAND HAVING ONE ADHESIVE SIDE

FIELD OF THE INVENTION

The invention relates to a process for applying an adhesive band having one adhesive side to the narrow rim of an elongated workpiece, particularly a coathanger of corrugated paper.

BACKGROUND OF THE INVENTION

In the wake of environmental demands that packaging material be economized so as to reduce the resulting garbage, coathangers of recyclable corrugated paper have been developed. These coathangers have a narrow rim which serves as the contact surface for the article of clothing that is hung thereon. Since in the case of stamped or cut corrugated paper this narrow rim is relatively sharp-edged and is smooth overall, it is necessary to apply an adhesive band to the narrow rim, one side of which is adhesive and other side of which is roughened. For example, a crêpe band may be used to cover the narrow rim. Heretofore, these coathangers of corrugated paper have been processed manually. However, this is not cost-effective.

SUMMARY OF THE INVENTION

A purpose of the present invention, therefore, is to create a process for applying an adhesive band with one adhesive side to an elongated workpiece, particularly to coathangers of corrugated paper, in a fully automatic and economical fashion. A further purpose is to create a device for implementation of this process.

A process according to the invention includes the following steps:

a) removal of a workpiece from a magazine;

b) sorting the workpieces into the corresponding compartments of a compartmented disk carousel that rotates on an axis;

c) forward cyclical rotation of the compartmented disk carousel, such that the workpieces placed in the compartments, which are positioned one on top of the other, are transported to other processing stations;

d) at the next processing station, pressing an adhesive band, which has one adhesive side, onto the narrow rims of the elongated workpieces, which project from the compartments of the carousel;

e) at a further processing station, cutting the adhesive band and pressing it onto the lateral profile of the narrow rim;

f) at still a further processing station, folding and pressing the projecting edges of the adhesive band against the workpiece, and g) ejecting the fully processed workpiece.

Using this process, the elongated workpieces can be processed in large numbers and in fully automatic fashion.

The workpieces removed from the magazine can be delivered to a compartmented lift having a plurality of compartments positioned one on top of the other; each compartment of the lift can receive a corresponding workpiece. The workpieces received in the compartmented lift can then be advanced into the corresponding compartments of a compartmented disk carousel which turns on an axis. The compartmented lift may consist of individual compartments, or of two coils which can be placed in turning motion and which hold only the sides of a workpiece and which lift the workpieces, approaching in succession, from the transport belt due to the turning motion of the coils, with the result that the workpieces are positioned beneath each other along the coil.

An advantageous feature of the process is that the adhesive tape is drawn from a roll and is conducted via a grooved shaft, into whose recesses circular knives project, so that the adhesive tape is divided into several parallel strips of tape. The number of strips corresponds to the number of the workpieces positioned one above the other in the compartmented disk carousel.

A smooth shaft can be used instead of this grooved shaft, in which case the smooth shaft interacts with the circular knives as a support shaft.

A device for implementing the process according to the invention consists of a magazine for storing and releasing the workpieces, piece by piece; a transport device for conveying the workpieces removed from the magazine; a compartmented lift with compartments to receive the workpieces from the transport device; an advancing mechanism by means of which the workpieces deposited one above the other in the compartmented lift are advanced into the corresponding compartments of the compartmented disk carousel, while the compartmented disk carousel consists of several circumferentially positioned sectors with the compartments arranged in stacked fashion to receive the workpieces; a pressing station for pressing the adhesive tape strips with one adhesive side to the narrow rims of the workpiece; a cutting station for severing the adhesive tape strips between the workpieces positioned in adjacent compartments of two sectors of the compartmented disk carousel; a folding and pressing station for folding and pressing the projecting edges of the adhesive bands to the workpieces; and an ejecting station. A device of this kind is able to implement the process according to the invention with unusual spatial economy.

The transport device advantageously includes two removal belts, one of which runs along the lower end of the magazine and thereby removes the lower workpiece. The second removal belt is positioned behind the magazine and facing the first belt, so that a workpiece can be conveyed between the two belts.

The removal belt may be narrower than the length of the workpieces stacked perpendicular to the direction of motion of the removal belts. The lateral ends of a lifting and lowering support device is able to overlap the conveyor belt laterally; by means of a device that brings about longitudinal displacement, e.g., a piston-cylinder configuration, the support device is able to lift the lowermost workpiece inside a magazine, and thus the stacked workpieces positioned on top of that workpiece, from the removal belt, so that during the time in which the workpieces are lifted from the removal belt no other workpiece is transported.

The compartmented lift may consist of several compartments positioned one on top of the other, which can be adjusted with respect to height relative to the transport device by a height-adjusting device. As a result, a workpiece can be delivered into each compartment of the compartmented lift. The compartmented lift may also consist of two coils driven in turning fashion, which hold the lateral ends of the workpieces and with a synchronized turning motion lift the workpiece from the transport belt. When several workpieces are taken up in succession by a coil and transported along the coil in the upward direction, a number of workpieces are received in different compartments.

The advancing mechanism with which the workpieces are pushed out of the compartmented lift and are moved into the adjacent compartments of the compartmented disk carousel preferably consists of two sliding rods that are moved in the longitudinal direction by a piston-free longitudinal displacement device.

The compartmented disk carousel advantageously consists of several segments positioned side by side around the circumference, with compartments positioned one on top of the other to receive the workpieces. Orienting pins positioned at the segment ends may run the height of the compartments; the end edges of the inserted workpieces rest against these orienting pins in such a way that the workpiece is centered.

At least one slot can be provided per carousel sector; this slot runs through all the plates bounding the compartments. At least one ejection pin can be moved back and forth in the slot. These ejection pins are used to eject the processed workpieces in a corresponding ejection station.

The pressing station may con, rise a grooved shaft and several circular knives positioned on top of each other which engage with the grooved shaft. This configuration permits adhesive bands with one adhesive side to be cut in a particularly simple fashion from a single wide adhesive tape strip.

The cutting station may comprise a knife, a deep-drawing tool positioned behind it, and behind this an application tool. In the cutting station, the knife is engaged and simultaneously performs a cut for all the adhesive bands positioned one on top of the other. After being cut, the adhesive bands are fed to the rim area of the workpieces by the deep-drawing tool. Countering the action of a spring, the deep-drawing tool can then be pressed into a recess of the application tool, with the result that the application tool rests against the still projecting rims of the adhesive bands, folding the bands and pressing them onto the workpieces.

Finally, the folding and cutting station may consist of a application tool having gap-like recesses with a width which is somewhat larger than the thickness of the workpiece, plus twice the thickness of the adhesive band. By engaging the tool, e.g., by means of a pressurized medium-piston-cylinder unit, the application tool folds the projecting rims of the adhesive band and presses them against the workpieces.

BRIEF DESCRIPTION OF THE DRAWINGS

Additional details and advantages of the invention will be described in greater detail with respect to the embodiments shown in the attached drawings, in which:

FIG. 5(a) is a schematic elevational view of a workpiece that can be processed according to a process of the invention.

FIG. 5(b) is a schematic side view of the workpiece of FIG. 5(a).

DETAILED DESCRIPTION OF THE PREFERRED EMBODIMENTS

Figure 1:
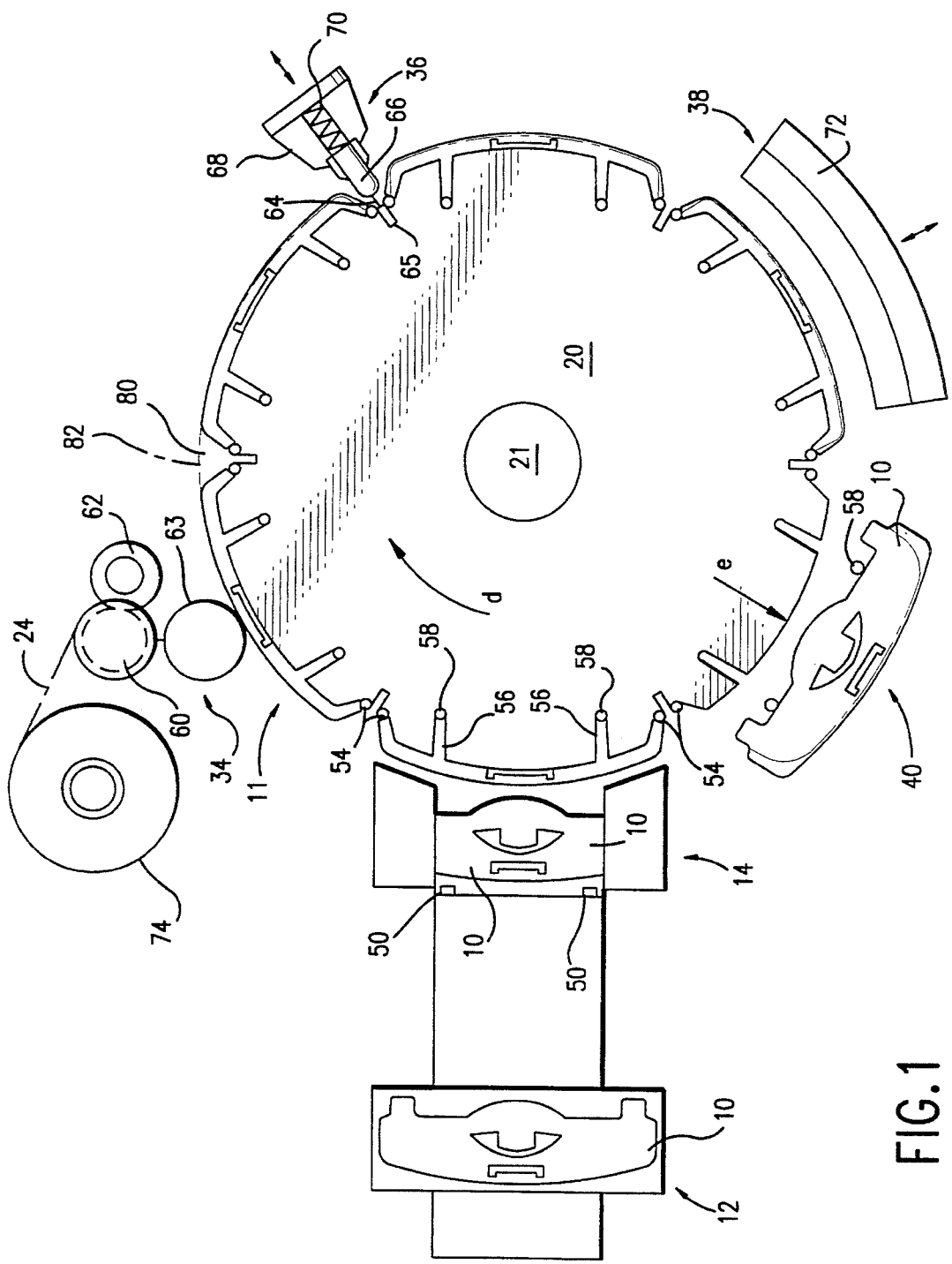
FIG. 1 is a schematic top view of an embodiment of a device according to the invention.

FIG. 5(a) shows an example of a workpiece to be processed using a process according to the invention. The workpiece is a coathanger 10 of corrugated paper, which exhibits an outer rim that is bent outward in convex fashion. Attached to this outer rim is an adhesive band 24—in this case, a crêpe band—that is adhesive on one side. As depicted in FIG. 5(a), the coathanger 10 has several punched-out areas. A punched-out area 100 forms a handle. A punched-out area 102 permits the coathanger 10 to be positioned onto a transport rod. In addition, semi-circular recesses 104 are provided which form nubs 106. Hanger loops of clothes to be hung can be placed around these nubs 106.

As can be seen from FIG. 5(b), the upper rims of a paper bag 108 that has been multiply folded are attached to the inside of two coathangers 10 along a gluing line 110. The multiply folded paper bag 108 is partially attached beneath clamp ends 112, which are applied in a single piece to the coathanger. In the design shown in FIGS. 5(a) and 5(b), the coathangers serve to accommodate, e.g. a shirt or a blouse. If these articles then need to be packed in the paper bag 108, the coathangers 10 can be simply turned over the folding rim 114.

Figure 2:
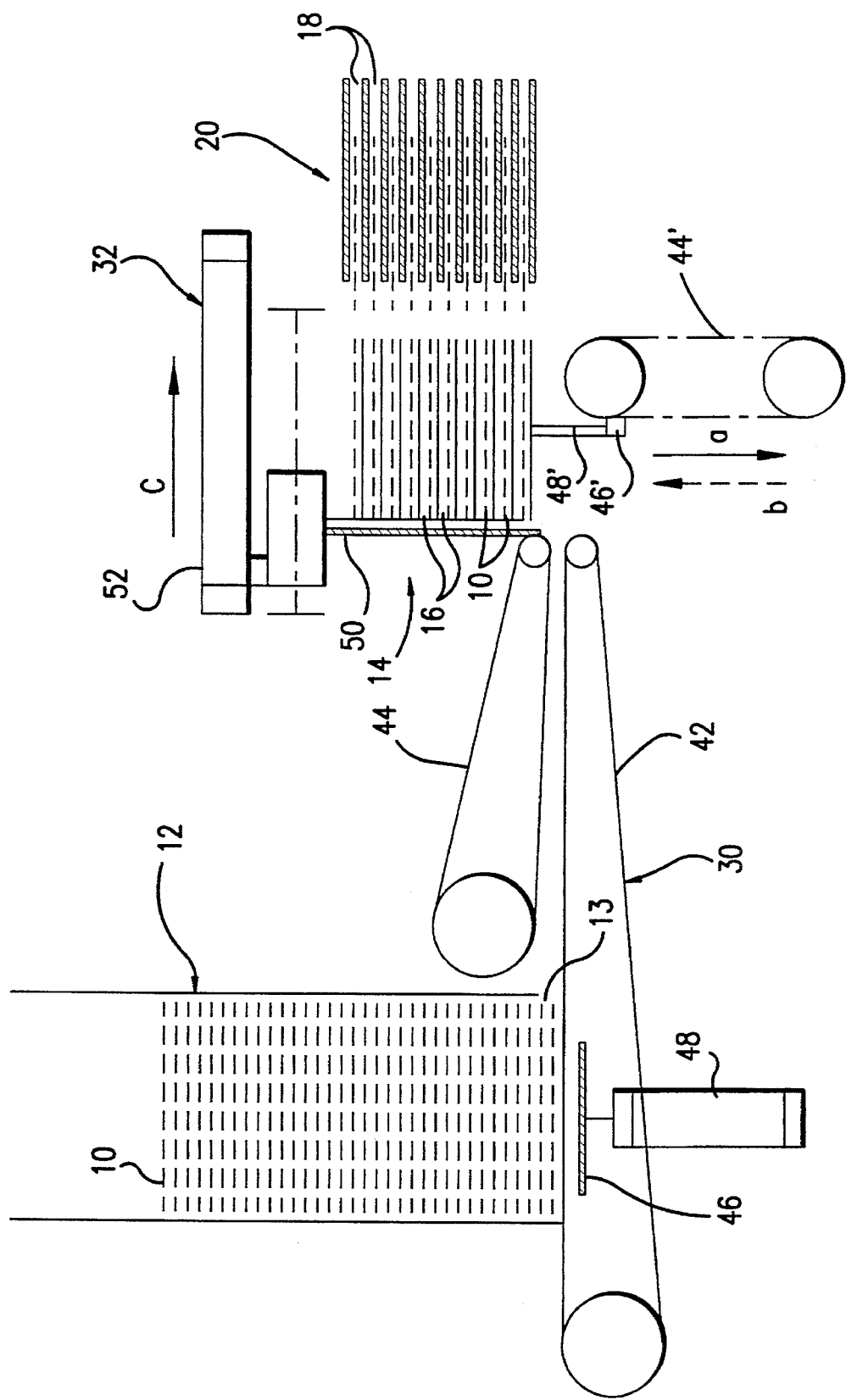
FIG. 2 is a schematic side view of a part of the embodiment shown in FIG. 1.
Figure 3:
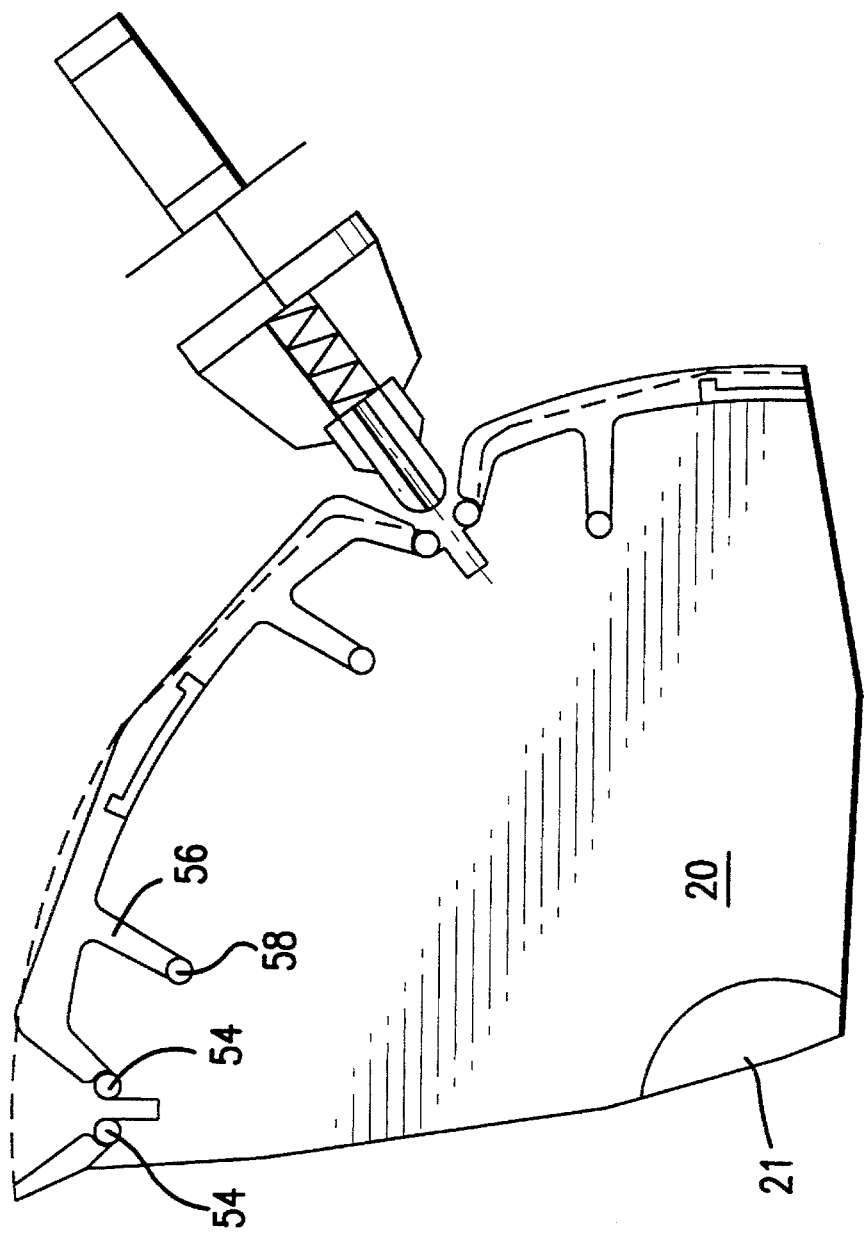
FIG. 3 is a schematic top view of a section of the embodiment shown in FIG. 1.

Using the device shown in FIG. 1, an adhesive band with one adhesive side, i.e., the crêpe band, is applied to the coathangers 10. The punched-out workpieces 10 are stacked in a magazine, as can be seen in FIGS. 1 and 2. One side of the magazine has an opening 13, which is somewhat higher than the width of the lowermost workpiece 10 and which runs over the entire width of the magazine 12. Running beneath the magazine 12 is conveyor belt 42 of transport device 30. The conveyor belt 42, on which the lowermost workpiece rests, transports the lowermost workpieces out of the magazine 12, whereupon the upper side of the workpiece is taken up by the second conveyor belt 44, which is positioned above conveyor belt 42. In this manner, the workpieces 10 can be continuously moved out of the magazine 12. The removal belts 42 and 44 are somewhat narrower than the magazine 12 and the elongated workpieces 10 positioned in it. Support elements, that can be moved longitudinally by means of a pressurized medium-piston-cylinder unit, are positioned to the side of the removal belt 42 beneath the magazine 12. The lowermost workpiece can be lifted from the side by means of these support elements 46, whose height is adjustable, and lifted away from the conveyor belt 42. This allows the removal of the workpieces 10 from the magazine to be controlled despite the continuous operation of the removal belt 42.

The workpieces 10 are fed to a transport lift 14, which in the present embodiment has ten compartments 16. The transport lift 14 may have a two-part design, as shown in FIG. 2, and may be adjustable from either side in the direction of arrow a or arrow b by means of chain drives 44' and rods 48' articulated to articulation points 46. As soon as a compartment 16 is filled with a workpiece the transport lift is transported to the next compartment.

Running between the two parts of the transport lift, as shown in FIG. 1, are two slide rods 50, which can be moved in the direction of arrow c by means of a corresponding piston-free shifting device. The shifting device 52 and the slide rods 50 form the advancing mechanism 32, by means of which the workpieces delivered to the compartmented lift are conveyed to the corresponding compartments 18 of a sector of the compartmented disk carousel 20.

The compartmented disk carousel 20 consist of six sectors with compartments 18 positioned one on top of the other; the compartments 18 receive the workpieces 10 in such a way that their narrow rims 11 project over the edge of the compartmented disk carousel. The compartmented disk carousel 20 is mounted on a rotational axis 21 that turns in the direction of arrow d. The compartmented disk carousel is driven in such a way that the individual sectors are moved in a cycle to different processing stations. At the first station the carousel is filled with the workpieces 10, as already described. The outer rims of the workpiece 10 rest on orienting pins 54 that run the height of the carousel. This gives the workpieces the desired orientation within the compartments 18 of the carousel 20.

After further transport of the compartments 18 filled with workpieces 10, the workpieces 10 being processed reach the pressing station 34 for pressing the adhesive strips with one adhesive side to the narrow rims 11 of the workpieces 10. Here, a wide adhesive tape 24 is pulled from a roll of adhesive tape and is transported by a grooved shaft. As shown in FIG. 1, knives 62 positioned one above the other engage in the grooves of the grooved shaft, with the result that the wide adhesive tape 24 is divided into a plurality of narrow adhesive bands 24. The number of bands 24 with one adhesive side thus cut corresponds to the number of workpieces 10 positioned one on top of the other in the compartmented disk carousel. Thus, in the present case ten adhesive bands 24 are cut. These bands are then pressed by a pressing roller 63 against the narrow rims 11 of the workpieces 10 in such a way that a portion of the band with one adhesive side projects from either side of the rim. As the compartmented disk carousel is turned through another sector, the bands with one adhesive side 24 are applied to the next workpiece 10. As a result, an area 82 arises between the workpieces 10 positioned in adjacent sectors of the carousel that spans a gusset 80 between the bands 24 and that does not come into contact with the narrow rims 11 of the hanger 10.

Figure 4:
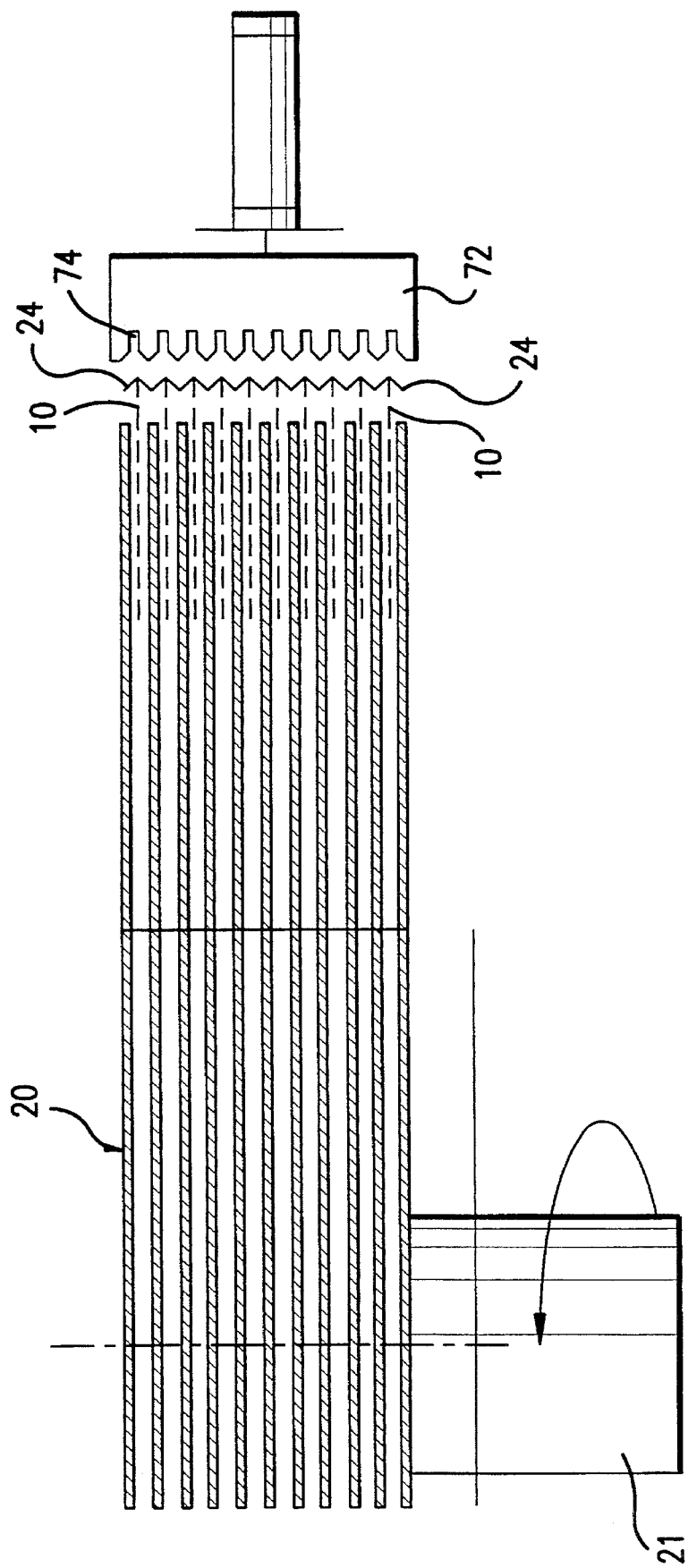
FIG. 4 is a schematic partial view of a part of the embodiment shown in FIG. 1.

In the following cutting station 36, the joined adhesive band strips 24 are separated in the middle of the gusset area 80 by a knife 64 that extends longitudinally. The knife 64 is mounted in a deep-drawing tool, which severs the adhesive bands positioned one above the other and then moves into the gusset area and thereby presses the ends of the adhesive strips onto the marginal areas of the narrow rims 11. During this process the knife 64 is received in a longitudinal slot 65 inside of the compartmented disk carousel 20. Positioned behind the deep-drawing tool 66 on both sides is an application tool 68 consisting of a plurality of slots. The multi-purpose tool can be compressed so that the deep-drawing tool 66 is pressed against a spring and into a recess in the application tool and thereby permits the grooves of the application tool 68 to slide over the rims of the workpieces 10 while simultaneously pressing the projecting edges of the adhesive bands 24 against the rims of the workpieces. The adhesive bands are thus applied in the marginal areas of the narrow rims 11. In another processing station 38, an application tool 72 is engaged over the remaining area of the narrow rims. This application tool 72 also has slot-like recesses 74, shown in FIG. 4, whose width is somewhat greater than the thickness of the workpiece 10 plus twice the thickness of the adhesive band. In this manner the remaining rims of the adhesive bands 24 can be folded and pressed.

In the next turn, the processed workpieces 10 reach the ejection station. Here the workpieces are ejected in the direction of arrow e by the ejection pins 58. The two ejection pins 58 engage with the grooves 56 in a given sector of the compartmented disk carousel 20.

Figure 6:
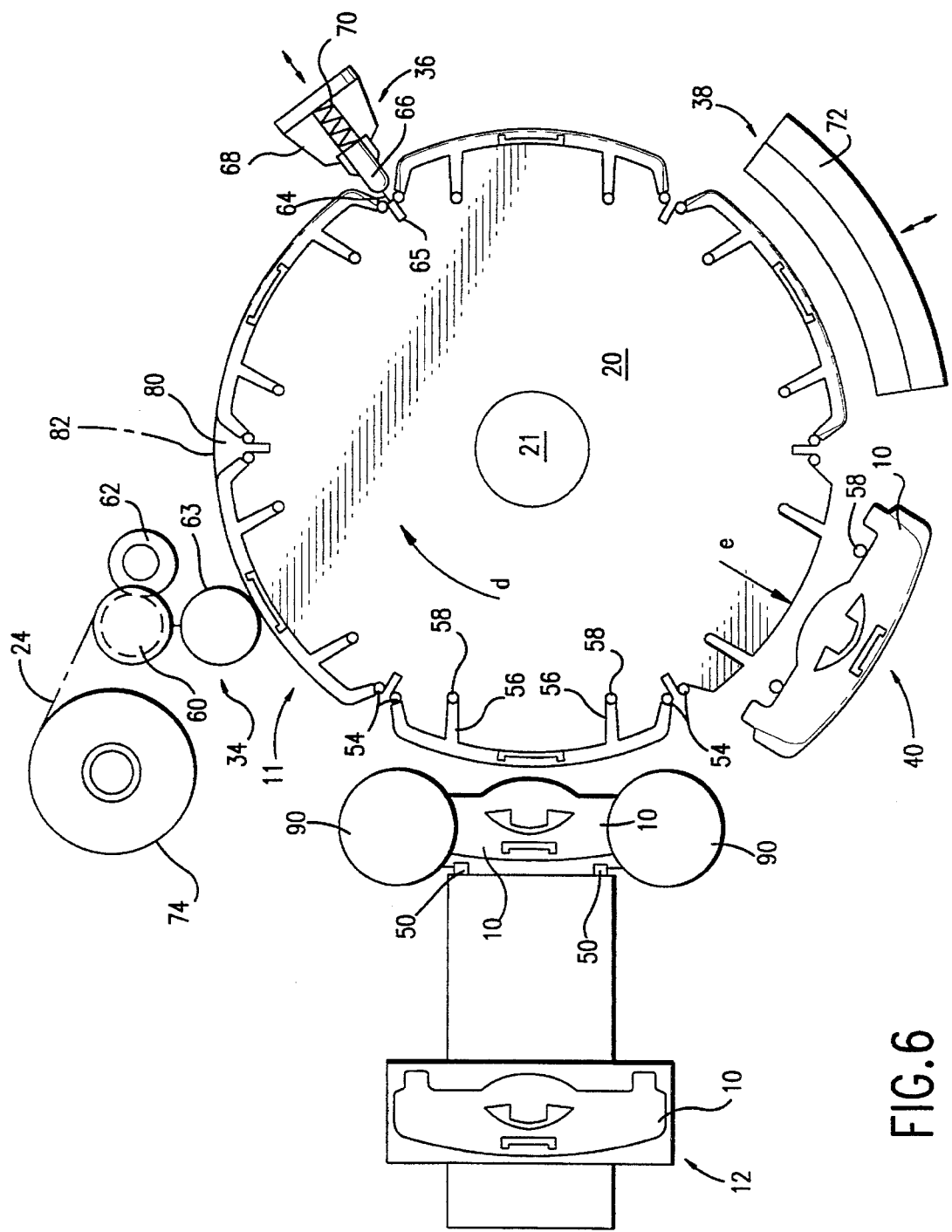
FIG. 6 is a schematic top view of a second embodiment of the device according to the invention, corresponding to the view shown in FIG. 1.
Figure 7:
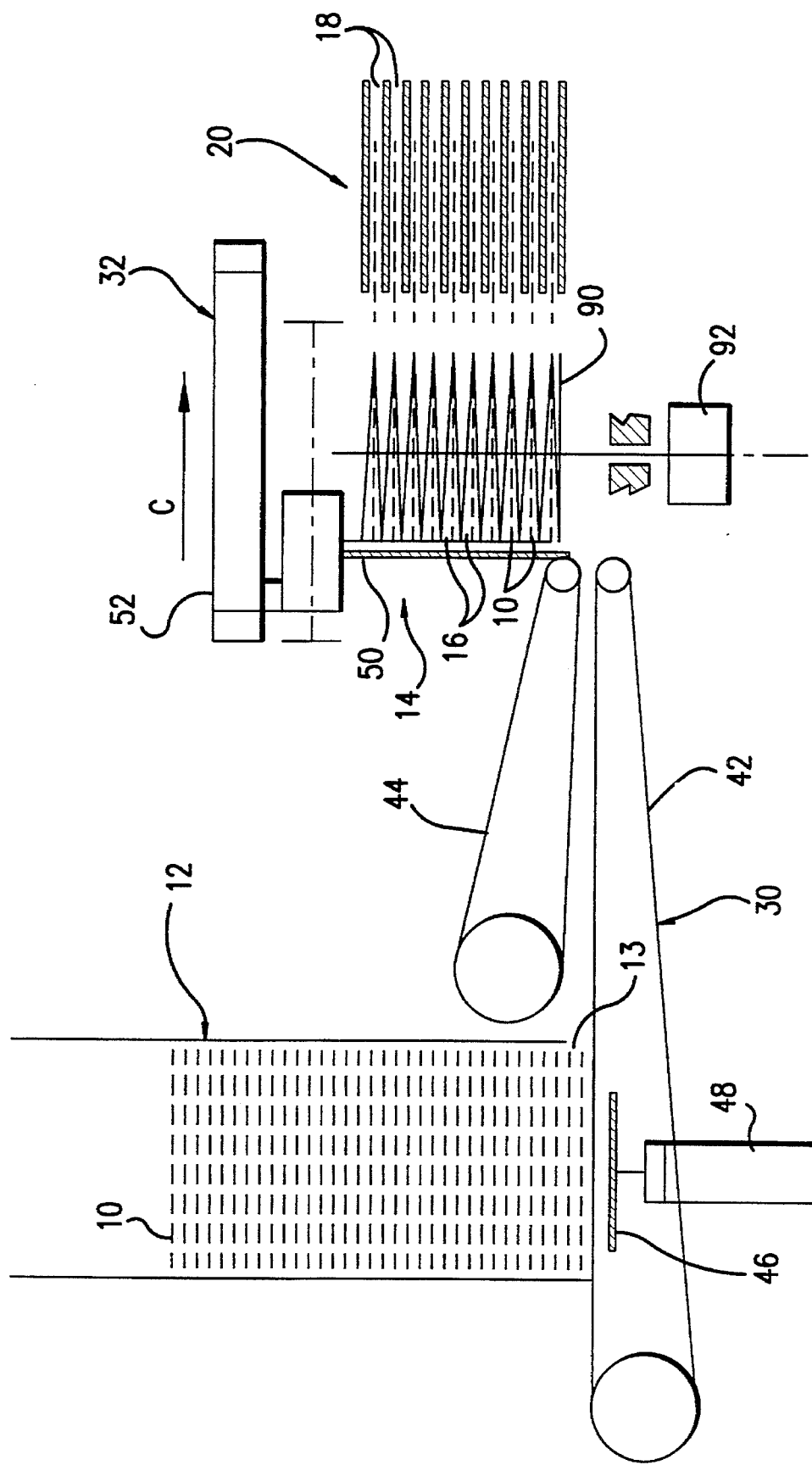
FIG. 7 is a schematic side view of a part of the embodiment of FIG. 6, corresponding to the view shown in FIG. 2.

In a further embodiment of a device according to the invention, shown in FIGS. 6 and 7, the compartmented lift 14 is designed as a coil lift. Two coils 90 synchronously driven by a motor 92 are positioned in such a way that they hold the outer ends of the workpieces 10.

While the invention has been described above with respect to certain embodiments thereof, it will be apparent to one skilled in the art that variations and modifications may be made without departing from the spirit and scope of the invention.

What is claimed is:

1. A process for applying an adhesive band with one adhesive side to a narrow rim of an elongated workpiece, particularly a coathanger of corrugated paper, comprising the following steps:

a) removing a plurality of workpieces (10) from a magazine (12), b) sorting the workpieces (10) into corresponding compartments (18) of a compartmented disk carousel (20) that rotates on an axis (22), c) cyclically rotating the compartmented disk carousel (20) forward, wherein the workpieces (10) placed in the compartments (18), which are positioned one on top Of the other, are transported to processing stations, d) at another processing station, pressing an adhesive band strip, which has one adhesive side, onto the narrow rim (11) of each of the elongated workpieces (10), which project from the compartments (18) of the carousel.

e) at a further processing station, cutting the adhesive band strips and pressing them onto lateral profiles of the narrow rims (11), f) at yet another processing station, folding and pressing the projecting edges (26) of the adhesive band strip against the workpieces, and g) ejecting each processed workpiece 10, wherein an adhesive band (24) with one adhesive side is removed from a tape roll (74) and conducted over a shaft (6) and circular knives (62) cut into the adhesive band (24), such that the adhesive band (24) is divided into a plurality of parallel adhesive band strips, the number of which corresponds to the number of the workpieces (10) positioned one above the other in the compartmented disk carousel (20).

* * * * *